Patented Aug. 10, 1943

2,326,128

UNITED STATES PATENT OFFICE 2,326,128

PRODUCTION OF COMPOSITE FABRIC

Camille Dreyfus, New York, N. Y., and George Schneider, Montclair, N. J., assignors to Celanese Corporation of America, a corporation of Delaware No Drawing. Application May 1, 1940,
Serial No. 332,734

12 Claims. (Cl. 117—122)

This invention relates to the production of composite fabrics, and relates more particularly to the preparation of a laminating fabric for adhesively uniting the components of the composite fabric.

In processes for preparing fabrics of various degrees of stiffness, for use in wearing apparel or other technical or commercial articles, by effecting the coalescence of two or more layers of fabric by operations involving the use of heat and pressure, one of said layers comprises a laminating fabric containing at least some yarns, filaments or fibers of an organic derivative of cellulose and a plasticizer for the organic derivative of cellulose. These laminating fabrics are prepared by applying to a fabric, made of or containing yarns, filaments or fibers of an organic derivative of cellulose, a suitable plasticizer or plasticizing compound in any suitable manner, as by dipping, spraying or padding the plasticizer or plasticizing compound in solution in a volatile organic solvent therefor on to the fabric.

The prior processes for preparing laminating fabrics were not only quite involved since they required the steps of dissolving the plasticizer in a volatile organic solvent therefor, applying the solution of plasticizer to the fabric, and then removing and recovering the volatile solvent by a suitable solvent recovery process, but were also quite expensive because they necessitated the use of relative costly organic solvents and large amounts of plasticizer. Moreover, the organic solvents employed were often of a toxic nature which caused discomfort to the operatives.

Furthermore, in prior processes for preparing laminating fabrics employing a fabric containing organic derivative of cellulose yarns and cellulose yarns, the plasticizer was not only taken up by the organic derivative of cellulose yarns but also by the cellulose yarns. The latter yarns have no affinity for the plasticizers employed in accordance with this invention and therefore the plasticizer was superficially and lightly retained by the same, thus causing the laminating fabric to be greasy to the touch and the outer layers of the composite fabrics made with such laminating fabrics appeared wet and discolored due to the plasticizer of the laminating fabric sweating from the cellulose yarns through the outer layers to the exposed surfaces. Attempts were made to eliminate the excessive greasiness in laminated fabric without destroying the adhesive properties thereof by removing some of the plasticizer. It was found, however, that when the plasticizer was reduced in quantity the layers of the resulting composite fabric did not adhere properly as was evidenced by laundering tests and the ease with which the layers of the composite fabric were separated.

It is accordingly, an important object of this invention to provide a process for preparing an improved laminating fabric which will be free from the above-mentioned and other disadvantages and which will be simple, expeditious and inexpensive in operation, requiring a reduced amount of plasticizer and no costly and toxic organic solvents.

It is also an object of this invention to prepare a laminating fabric containing yarns, filaments or fibers of an organic derivative of cellulose and a plasticizer therefor which is dry to the hand and which will be free from greasiness even after exposure to atmospheric conditions for a long period of time.

Another object of this invention is the preparation of a laminating fabric containing yarns, filaments or fibers of an organic derivative of cellulose and a plasticizer therefor, which may be easily handled or stored and which has enhanced binding power or adhesion when employed in the production of composite fabrics.

A further object of this invention is to prepare improved laminating fabric, suitable for use in the production of composite fabric of any desired degree of increased stiffness, which is dry and not greasy to the touch and which may be put up in roll or bolt form and stored for an indefinite period of time without danger of the same sweating out the plasticizer or becoming greasy.

Still another object of this invention is the provision of a laminating fabric which, when employed in the production of composite fabrics, yields a product which will not appear wet and discolored due to the sweating of plasticizer through the outer layers thereof.

Other objects of this invention will appear from the following detailed description.

In accordance with this invention, we prepare a laminating fabric by applying plasticizer to a fabric made of or containing organic derivative of cellulose filaments or fibers, and preferably a fabric containing organic derivative of cellulose filaments or fibers and cellulose filaments or fibers, in the presence of water or other liquid that preferably has no solvent action on either the fabric or the plasticizer, with or without a penetrating agent. The water penetrates and coats the cellulose filaments or fibers thus preventing the same from absorbing any appreciable amount of plasticizer, which in any case has no affinity for the cellulose filaments or fibers. The organic derivative of cellulose component of the fabric is water-repellant but readily absorbs the plasticizer therefor. The presence of the penetrating agent causes the organic derivative of cellulose component of the fabric to absorb the plasticizer in a shorter period of time.

In one form of our invention, a fabric containing yarns of an organic derivative of cellulose and cellulose yarns is thoroughly wetted with the non-solvent liquid, which is preferably water for reasons of economy and which may contain a small amount of penetrating agent for the organic derivative of cellulose, in any suitable manner and, while the fabric is still in a thoroughly wet condition, plasticizer for the organic derivative of cellulose is applied thereto, for instance by a padding roll, or preferably by beading or calender rolls, whereby the amount of plasticizer being applied to the fabric may be controlled. The liquid and/or the rolls may be heated. The fabric is then dried in any suitable manner to remove substantially all of the liquid therefrom. The water or non-solvent liquid may contain some small amount of coloring matter, preferably blue, which will prevent yellowing of the outer layer or layers when the laminating fabric is employed for the production of composite fabrics which are white or light colored.

In another form of our invention we apply plasticizer to a fabric containing organic derivative of cellulose yarns and cellulose yarns by passing the same repeatedly through a bath containing a plasticizer for the organic derivative of cellulose in the form of an emulsion or colloidal solution in water or aqueous liquid in the presence of a small amount of penetrating agent, until the fabric has received the desired amount of plasticizer thereon. Preferably the liquid of the bath is agitated in any suitable manner while the fabric is being passed therethrough. The fabric is then dried in any suitable manner to remove substantially all of the liquid therefrom. The emulsion may contain some small amount of coloring matter, preferably blue, which will prevent yellowing when the laminating fabric is employed for the production of composite fabrics which are white or light colored.

In both of the above processes the organic derivative of cellulose component of the fabric, where the fabric contains organic derivative of cellulose filaments or fibers together with non-thermoplastic filaments or fibers, absorbs the plasticizer, little or no plasticizer being taken on by the non-thermoplastic component because the non-solvent liquid prevents the absorption of the same by the non-thermoplastic component which also has no affinity itself for said component. Accordingly, our process requires a smaller amount of plasticizer than prior processes for making laminating fabrics.

While this invention is particularly applicable in connection with laminating fabrics containing cellulose acetate it may be used with other organic derivatives of cellulose such as cellulose propionate and cellulose butyrate, and cellulose ethers such as ethyl cellulose and benzyl cellulose. Our process also contemplates the use of fabrics containing mixed esters of cellulose such as, for example, aceto-propionate and cellulose aceto-butyrate, and also synthetic linear polyamide condensation products such as the polyamides derived from amino-acids or from the condensation of diamines with carboxylic acid, e. g. polyhexamethylene adipamide. However, this invention will be described more specifically in connection with cellulose acetate, and while the acetone-soluble cellulose acetate will generally be employed because of its commercial availability, cellulose acetate of other solubility characteristics may be used in our process.

Any suitable plasticizer may be employed in accordance with our process. For example, in the case where the fabric to be treated contains cellulose acetate there may be employed ethyl para-toluene sulphonamide, monomethyl xylene sulphonamide, dimethyl phthalate, diethyl phthalate, triphenyl phosphate, dibutyl tartrate or mixtures of two or more of these. The amount of plasticizer used will generally be from 50 to 150%, based on the weight of the cellulose acetate present in the fabric. The plasticizer employed is preferably not soluble in water in the case where water is used as the non-solvent medium in the process.

As stated above, in order to increase the rate of absorption of the plasticizer by the cellulose acetate component of the fabric and in order to obtain a greater and better degree of absorption a penetrating agent for the cellulose acetate is employed. These penetrating agents act upon the cellulose acetate component of the fabric in such a manner as to render the same more amenable to penetration by the plasticizer whereby the plasticizer is more readily absorbed thereby.

Any suitable penetrating agent may be employed. Examples of penetrating agents to be employed in this process in connection with cellulose acetate are Turkey red oil, xylene, toluene, monopol oil, pine oil, sulphonated pine oil, cyclohexanol, cyclohexanone, diacetin, tetralin, or mixtures of two or more of these materials. Examples of such mixtures are a mixture of Turkey red oil and xylene, a mixture of Turkey red oil, tetralin and sodium silicate, and a mixture of cyclohexanol, tetralin and soap.

Generally the amount of penetrating agent required is relatively small, say on the order of 0.5 gram per liter of emulsion or colloidal solution of plasticizer and water. The amount of penetrating agent present should at no time be so great as to form with the water or other non-solvent liquid present a mixture that is a solvent for either the cellulose acetate or the plasticizer. As stated, the presence of these penetrating agents decreases the time required for the absorption by the cellulose acetate of the desired amount of plasticizer.

While water is employed in the present process for reasons of economy, other more or less volatile liquids may be employed, particularly those that have no solvent action on the cellulose acetate or plasticizer. While the water or emulsion employed in the process may be at room temperature or even below room temperature, we prefer to heat the water or emulsion to a temperature of from 35 to 100° C. in order to expedite the action. However, if relatively volatile plasticizers are employed, the temperature of treatment should preferably be reduced in order to avoid loss of plasticizer due to volatilization at more elevated temperatures.

The fabric employed in accordance with this invention is preferably one containing filaments or fibers of cellulose acetate together with filaments or fibers of a non-thermoplastic compound, more preferably a fabric containing about 25 to 35% of cellulose acetate filaments or fibers and 75 to 65% of non-thermoplastic filaments or fibers. The fabric may be formed by weaving, knitting, knotting or netting the filaments or yarns of the cellulose acetate with filaments or yarns of non-thermoplastic materials into a fabric. The production of the fabric is preferably effected in such a manner that there is a uniform dispersion of the cellulose acetate filaments or yarns through the yarns or filaments of the non-thermoplastic compound. The non-thermoplastic component of the fabric may consist of cotton, regenerated cellulose, linen, etc. In weaving the fabric the cellulose acetate yarns may be arranged to alternate in the warp or in the weft or both in any desired degree to effect the uniform dispersion through the yarns of non-thermoplastic fibers.

Laminating fabric made in accordance with this invention is an improvement over laminating fabrics made in accordance with prior processes. Thus, the laminating fabric of this invention is at all times dry to the touch, does not become greasy and does not discolor the outer layers of the composite fabric. Moreover, the composite fabrics prepared with the laminating fabric made in accordance with the present invention have excellent adhesion. Furthermore, as indicated above the process of the present invention requires the use of less plasticizer than heretofore found necessary. The use of this reduced amount of plasticizer, which is substantially wholly absorbed by the cellulose acetate component of the fabric makes for a better composite fabric, since no plasticizer seeps through on to the outer layer or layers to give the same a wet or oily appearance.

In order to further illustrate our invention, but without being limited thereto the following specific examples are given:

*Example I*

A fabric formed by weaving 35% cellulose acetate yarns with 65% cotton yarns is thoroughly wetted by passing the same through a vessel containing water at a temperature of 50° C. and containing 0.5 gram per liter of Turkey red oil. The fabric is then passed through a pair of beading rollers where dimethoxy ethyl phthalate is applied thereto. The beading rollers are so regulated that 120% on the weight of the cellulose acetate of dimethoxy ethyl phthalate is taken up by the cellulose acetate. The treated fabric is then passed through a heating chamber to remove substantially all of the water therefrom. The fabric may then be rolled into the desired form for storage or shipment.

*Example II*

A fabric formed by weaving 35% cellulose acetate yarns with 65% cotton yarns is passed repeatedly through a bath containing an emulsion of dimethoxy ethyl phthalate in water at a temperature of 50 to 60° C. and containing 0.5 gram per liter of the emulsion of Turkey red oil and then through a pair of nip rollers to remove the excess of the emulsion. The temperature and time of treatment is so regulated that there is about 120% on the weight of the cellulose acetate of dimethoxy ethyl phthalate taken up by the cellulose acetate. The treated fabric is then passed through a heating chamber to remove substantially all of the water therefrom. The fabric may then be rolled into the desired form for storage or shipment.

The laminating fabric may be employed in the formation of composite or laminated fabrics which may be used for any purpose where a slightly stiffened or stiff and/or a more or less impermeable fabric is desired. An important application of such products is wearing apparel which may be formed in whole or in part of fabrics made of or prepared from said laminated or composite fabrics. Thus, collars, or cuffs for shirts may be formed entirely of the laminated or composite fabrics. Alternatively, shirts may be made wherein the attached collars, neckbands, cuffs, fronts or bosoms are made of such materials. Hats or parts of hats may likewise be formed of such material as may be the inner or sweat bands of hats, visors for caps, cuffs or gauntlets for gloves, inner linings of cravats, stiffening material used in the inner portion of garments such as coats to help retain the shape thereof, shoes and parts thereof, the head piece of gas masks, etc. Fabrics formed by employing this invention may be used for any industrial or technical purposes where fabric of increased stiffness and/or impermeability is required.

The process of effecting the lamination of the laminating fabric with one or more layers of fabric may be any suitable method as, for instance, the wet method wherein the assembly of superimposed fabrics are wetted with water or steam and then subjected to heat and pressure, the dry method where the assembly of superimposed fabrics are subjected directly to heat and pressure in the absence of liquids, or the solvent method wherein the superimposed layers of fabric are wetted with a liquid or vapor which is a solvent or swelling agent at elevated temperatures for the organic derivative of cellulose. Although any process of effecting the lamination may be employed we prefer to employ a two-step process in which the superimposed articles are first bound together by a dry method of laminating and then the adhesion between the layers is further increased by a wet method of laminating. For instance, the assembly of fabrics bound by the dry method of laminating may be treated with water and then again subjected to heat and pressure. This latter method is more fully disclosed in Patent No. 2,126,830. The laminating fabric of this invention may be employed in any of the assemblies and in any manner described in said patent.

It is to be understood that the foregoing detailed description is given merely by way of illustration and that many variations may be made therein without departing from the spirit of our invention.

Having described our invention, what we desire to secure by Letters Patent is:

1. Process for preparing a laminating fabric for adhesively uniting the components in a composite fabric, which comprises applying to a fabric containing yarns of an organic derivative of cellulose and cellulose yarns a water-insoluble plasticizer for the organic derivative of cellulose in the presence of water, and drying the treated fabric to remove substantially all of the water therefrom.

2. Process for preparing a laminating fabric for adhesively uniting the components in a composite fabric, which comprises applying to a fabric containing yarns of cellulose acetate and cellulose yarns a water-insoluble plasticizer for the cellulose acetate in the presence of water, and drying the treated fabric to remove substantially all of the water therefrom.

3. Process for preparing a laminating fabric for adhesively uniting the components in a composite fabric, which comprises wetting a fabric containing yarns of an organic derivative of cellulose and cellulose yarns with water, applying substantially water-insoluble plasticizer for the organic derivative of cellulose to said wet fabric, and drying the treated fabric to remove substantially all of the water therefrom.

4. Process for preparing a laminating fabric for adhesively uniting the components in a composite fabric, which comprises wetting a fabric containing yarns of cellulose acetate and cellulose yarns with water, applying substantially water-insoluble plasticizer for the cellulose acetate to said wet fabric, and drying the treated fabric to remove substantially all of the water therefrom.

5. Process for preparing a laminating fabric for adhesively uniting the components in a composite fabric, which comprises wetting a fabric containing yarns of an organic derivative of cellulose and cellulose yarns with water containing a small amount of penetrating agent for the organic derivative of cellulose, applying substantially water-insoluble plasticizer for the organic derivative of cellulose to said wet fabric, and drying the treated fabric to remove substantially all of the water therefrom.

6. Process for preparing a laminating fabric for adhesively uniting the components in a composite fabric, which comprises wetting a fabric containing yarns of cellulose acetate and cellulose yarns with water containing a small amount of penetrating agent for the cellulose acetate, applying substantially water-insoluble plasticizer for the cellulose acetate to said wet fabric, and drying the treated fabric to remove substantially all of the water therefrom.

7. Process for preparing a laminating fabric for adhesively uniting the components in a composite fabric, which comprises wetting a fabric containing yarns of cellulose acetate and cellulose yarns with water at a temperature of 35 to 100° C. and containing about 0.5 gram per liter of Turkey red oil, applying dimethoxy ethyl phthalate to said wet fabric in an amount equal to about 120% on the weight of the cellulose acetate present in the fabric and drying the treated fabric to remove substantially all of the water therefrom.

8. Process for preparing a laminating fabric for adhesively uniting the components in a composite fabric, which comprises applying to a fabric containing yarns of an organic derivative of cellulose and cellulose yarns an aqueous dispersion of a substantially water-insoluble plasticizer, and drying the treated fabric to remove substantially all of the liquid therefrom.

9. Process for preparing a laminating fabric for adhesively uniting the components in a composite fabric, which comprises applying to a fabric containing yarns of cellulose acetate and cellulose yarns an aqueous dispersion of a substantially water-insoluble plasticizer, and drying the treated fabric to remove substantially all of the liquid therefrom.

10. Process for preparing a laminating fabric for adhesively uniting the components in a composite fabric, which comprises applying to a fabric containing yarns of an organic derivative of cellulose and cellulose yarns an aqueous dispersion of a substantially water-insoluble plasticizer in the presence of a penetrating agent for the organic derivative of cellulose, and drying the treated fabric to remove substantially all of the liquid therefrom.

11. Process for preparing a laminating fabric for adhesively uniting the components in a composite fabric, which comprises applying to a fabric containing yarns of cellulose acetate and cellulose yarns an aqueous dispersion of a substantially water-insoluble plasticizer in the presence of a penetrating agent for the cellulose acetate, and drying the treated fabric to remove substantially all of the liquid therefrom.

12. Process for preparing a laminating fabric for adhesively uniting the components in a composite fabric, which comprises applying to a fabric containing yarns of cellulose acetate and cellulose yarns an aqueous dispersion of dimethoxy ethyl phthalate at a temperature of about 50 to 60° C. and containing about 0.5 gram per liter of the emulsion of Turkey red oil, removing the excess of the emulsion from the fabric, and drying the treated fabric to remove substantially all of the water therefrom.

CAMILLE DREYFUS.
GEORGE SCHNEIDER.